(12) United States Patent
Huey et al.

(10) Patent No.: US 9,913,113 B1
(45) Date of Patent: Mar. 6, 2018

(54) COMMUNICATING UTILITY DATA OVER A CELLULAR NETWORK WITH PRIORITY

(71) Applicant: Sprint Communications Company L.P., Overland Park, KS (US)

(72) Inventors: Brian Michael Huey, Urbandale, IA (US); Gregory John Bahas, Copley, OH (US)

(73) Assignee: Sprint Communications Company L.P., Overland Park, KS (US)

(*) Notice: Subject to any disclaimer, the term of this patent is extended or adjusted under 35 U.S.C. 154(b) by 148 days.

(21) Appl. No.: 13/832,898

(22) Filed: Mar. 15, 2013

(51) Int. Cl.
  *H04M 11/04* (2006.01)
  *H04W 4/14* (2009.01)

(52) U.S. Cl.
  CPC .................................... *H04W 4/14* (2013.01)

(58) Field of Classification Search
  None
  See application file for complete search history.

(56) References Cited

U.S. PATENT DOCUMENTS

| | | | |
|---|---|---|---|
| 7,027,808 B2 * | 4/2006 | Wesby .......................... | 455/419 |
| 2008/0001735 A1 * | 1/2008 | Tran .......................... | 340/539.22 |
| 2008/0137824 A1 * | 6/2008 | Shaked ...................... | 379/106.01 |
| 2009/0176499 A1 * | 7/2009 | Buckley ........................ | 455/445 |
| 2010/0066484 A1 * | 3/2010 | Hanwright et al. .......... | 340/3.44 |
| 2010/0069099 A1 * | 3/2010 | Dunn et al. .................... | 455/466 |
| 2010/0093306 A1 * | 4/2010 | Hwang et al. ............. | 455/404.2 |
| 2010/0124898 A1 * | 5/2010 | Qu et al. ..................... | 455/404.1 |
| 2012/0025979 A1 * | 2/2012 | Monnerie et al. ......... | 340/539.22 |
| 2012/0184307 A1 * | 7/2012 | van Velsen ................... | 455/466 |
| 2014/0159907 A1 * | 6/2014 | Sykes et al. ................. | 340/635 |

* cited by examiner

*Primary Examiner* — Suhail Khan

(57) ABSTRACT

Embodiments of the present invention provide secure, reliable communications for utility control devices during emergency conditions. Emergency conditions include power outages, natural disasters, and periods of network congestion. The network may be a radio access network, such as one operated by a mobile telephone carrier. The communications between the utility control devices and the network are wireless. In one embodiment, wireless communications are transitioned to a different wireless communication protocol during emergency conditions. For example, during an emergency, communications may be sent using short-message-service ("SMS") messages.

18 Claims, 5 Drawing Sheets

COMMUNICATING UTILITY DATA OVER A CELLULAR NETWORK WITH PRIORITY

SUMMARY

Embodiments of the invention are defined by the claims below. A high-level overview of various embodiments of the invention is provided to introduce a summary of the systems, methods, and media that are further described in the detailed description section. This summary is neither intended to identify key features or essential features of the claimed subject matter, nor is it intended to be used as an aid in isolation to determine the scope of the claimed subject matter.

Embodiments of the present invention provide secure, reliable communications for utility control devices during emergency conditions. Emergency conditions include power outages, natural disasters, and periods of network congestion. The network may be a radio access network, such as one operated by a mobile telephone carrier. The communications between the utility control devices and the network are wireless.

In one embodiment, wireless communications are transitioned to a different communication protocol during emergency conditions. For example, during an emergency, communications may be sent using short-message-service ("SMS") messages. In one embodiment, the SMS message sent during emergency conditions is addressed to a short code selected based on the emergency or condition detected. For example, a first short code could be associated with a power outage. A second short code could be associated with power restoration.

BRIEF DESCRIPTION OF THE SEVERAL VIEWS OF THE DRAWINGS

Illustrative embodiments of the invention are described in detail below, with reference to the attached drawing figures, which are incorporated by reference herein, and wherein.

DETAILED DESCRIPTION

Figure 1:
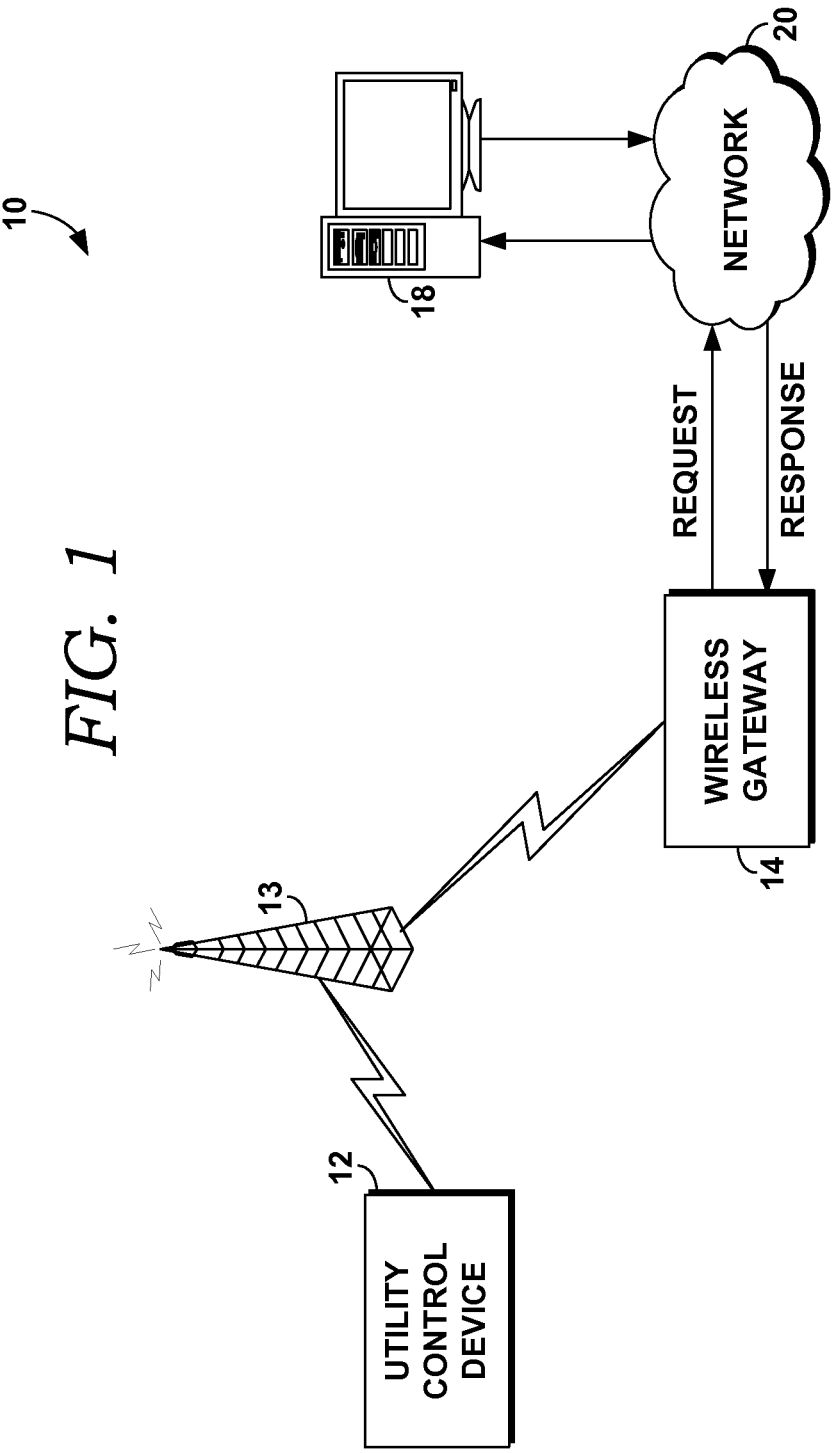
FIG. 1 is a network diagram of an exemplary telecommunications system according to embodiments of the invention.

Embodiments of the invention provide systems, methods, and computer-readable storage media with computer-readable instructions embodied thereon for controlling a preferred roaming list. The terms "step," "block," etc. might be used herein to connote different acts of methods employed, but the terms should not be interpreted as implying any particular order, unless the order of individual steps, blocks, etc. is explicitly described. Likewise, the term "module," "component," etc., might be used herein to connote different components of systems employed, but the terms should not be interpreted as implying any particular order, unless the order of individual modules, components, etc., is explicitly described.

Embodiments of the present invention provide secure, reliable communications for utility control devices during emergency conditions. Emergency conditions include power outages, natural disasters, and periods of network congestion. The network may be a radio access network, such as one operated by a mobile telephone carrier. The communications between the utility control devices and the network are wireless.

The utility control devices monitor and/or control infrastructure conditions within a utility's network. For example, line monitors may monitor the current passing through an electrical utility's power lines. Other monitors may determine the volume of water, gas, oil, or some other fluid traveling through a pipe at a given time. In addition, line pressure and temperature could be monitored.

In addition to monitoring conditions within a utility's infrastructure, the utility control devices may control conditions within the infrastructure. For example, an electrical switch, distribution automation device, fluid or gas flow control may be opened, closed, or throttled by a utility control device. The utility control device may include its own internal programming and may take action as directed by wireless messages received from a utility control server.

During normal conditions, the wireless communications may occur using one or more different communication protocols. During emergency conditions, quality of service ("QOS") may be changed to prioritize messages received from utility control devices or being transmitted to the utility control devices over a wireless interface. In one embodiment, wireless communications are transitioned to a different communication protocol during emergency conditions. For example, during an emergency, communications may be sent using short-message-service ("SMS") messages.

In one embodiment, the SMS message sent during emergency conditions is addressed to a public or private short code selected based on the emergency condition detected. A private short code is accessible by only pre-authorized devices and pre-authorized groups of devices. For example, a first short code could be associated with a power outage. A second short code could be associated with power restoration. For a water utility, a short code could be associated with a loss in pressure, while a different short code is associated with a surge in pressure. In one embodiment, a short code message is generated as a last gasp message when power is lost to the utility control device. The last gasp message may be generated by power stored in a capacitor or by backup battery power.

In one embodiment, the utility control device may switch to SMS messaging upon determining a messaging event has failed using a different access control technology. Thus, network congestion or some other temporary failure of the connection between the utility control device and the base station may cause a switch to alternative access technologies, including SMS.

The term "message" refers to messages communicated between components within a messaging network. The message may be communicated in telecommunications protocol. The "SMS" and "MMS" standards for telephony message systems are considered as a potential embodiment of the telecommunications protocol that may be used to communicate the messages discussed herein. In particular, short messaging service (SMS) is typically a transport architecture for sending text messages (e.g., 160 characters or less), while multimedia messaging service (MMS) allows for sending messages that include multimedia objects (e.g., images, audio, video, rich text, etc.). These messaging systems are mainly deployed in wireless networks where a short messaging service center (SMSC), or a multimedia messaging service center (MMSC) provides a store-and-forward mechanism where a notification may be sent to a different wireless device or server. Although SMS and MMS telecommunications protocol are discussed below, they are only two examples of suitable message systems within a network environment and are not intended to suggest any limitation as to scope of use or functionality of the invention.

In addition to exchanging messages with a central utility server, the utility control devices may communicate directly with other control devices in the network or private group. The control devices may send SMS messages to each other with instructions or an update on network conditions at a different point in the network.

Telecommunications Environment

An overview of a telecommunications system will be described, with reference to a network diagram of FIG. 1, which illustrates an exemplary wireless network system 10. Wireless network system 10 includes utility control device 12, a wireless gateway 14, a database 16 including electronic content, a utility server 18, and an information network 20, such as the World Wide Web (WWW). However, none of the embodiments of the invention are limited to these components and more, fewer, or other components can also be used in wireless network system 10. For simplicity, only one wireless gateway 14, database 16, and utility server 18 are illustrated in FIG. 1. However, embodiments of the invention also contemplate multiple gateways, databases, and database servers.

Exemplary utility control devices 12 include a line reader, Capacitor Controller, Recloser, smart meter, substation controls, transformers, pump monitors, pressure gauges, thermal couples, valve controls, and other components that monitor conditions or control operations within utility infrastructure. Utility control devices 12 may include devices that typically connect using a wireless communications medium such as radio frequency (RF) devices, infrared (IR) devices, or integrated devices combining one or more of the preceding devices. A utility control device, as described herein, refers to any type of utility control device capable of communicating wirelessly in a cellular network. The utility control devices may include a processor and computer-storage media to perform various functions.

The utility control device 12 may include a general computing system used in accordance with embodiments of the invention. A utility control device's computing system includes a bus that directly or indirectly couples a memory region, one or more processors, one or more presentation components, one or more sensors, input/output ports, input/output components, radio components, and a power supply. The bus may be representative of one or more busses, such as an address bus, data bus, or any combination thereof.

The information network 20 is configured to allow network connections between a utility control device 12 and other networked devices, such as utility server 18. The information network 20 may be configured to employ a means of communicating information from one computing device to another, such as through a universal serial bus (USB) port, Ethernet link, or any combination thereof. In one embodiment, the information network 20 may be the Internet, or may include local area networks (LANs), wide area networks (WANs), or direct connections.

Information network 20 may further employ a plurality of wireless access technologies including, but not limited to, $2^{nd}$ (2G), $3^{rd}$ (3G), and $4^{th}$ (4G) generation radio access for cellular systems. Access technologies such as 2G, 3G, 4G, 4G LTE, and future access networks may enable wide area coverage for network devices with various degrees of mobility. For example, the information network 20 may enable a wireless network connection over one of the aforementioned access technologies using a protocol for wireless data transfer such as Global System for Mobile communication (GSM), General Packet Radio Services (GPRS), Enhanced Data GSM Environment (EDGE), and Wideband Code Division Multiple Access (WCDMA) and Code Division Multiple Access (CDMA).

The network 20 may utilize any standards and protocols necessary for handling SMS messages, including for example but not limitation, Global System for Mobile Communications (GSM), Wideband Code Division Multiple Access (WCDMA), Freedom of Mobile Multimedia Access (FOMA), Code Division Multiple Access (CDMA) and other third generation (3G) network protocols.

Embodiments of the invention may utilize SMS message origination points such as wireless and wired devices. Messages may enter the network 20 via a number of methods which are not described in detail herein, but may include, for example a message originating wirelessly from a utility control device 12. Alternatively, a system may send an SMS message from a wired device, such as for example a personal computer with a connection to the Internet or across Virtual Private Network (VPN). Upon origination, the message may be routed, transferred, and stored, among other processes, by a number of network components. The network components may include a base station, a switch, a mobile originated short message service center, a private short message service center, a public shared message switching center, a network switching subsystem, and a mobile switching server.

Following handling of the SMS message by the network components, the message may be transmitted to an SMS message router. The SMS message router may receive SMS messages from various network components and then route or forward the SMS messages to a desired destination. Such a destination may include a wireless terminated short message service center (WT-SMSC) responsible for delivering SMS messages to the specified recipient of the SMS message.

For example, the WT-SMSC is responsible for delivery of the SMS message to a utility control device. The WT-SMSC may query a home location register (HLR) to determine the location of the receiving device. The HLR contains a database comprising, among other things, the location of the receiving device. The HLR provides the location information to the WT-SMSC, thereby allowing the WT-SMSC to determine proper routing for delivery of the SMS message to the receiving device.

The routing of the SMS message to the receiving device may traverse components such as a switch and a base station. The base station may transmit the SMS message to the receiving device wirelessly via radio communications technologies.

The wireless gateways 14 can provide a Code Division Multiple Access (CDMA), Wideband CDMA (WCDMA), Time Division-Synchronous CDMA (TD-SCDMA), Advanced Mobile Phone Service (AMPS), Digital AMPS (D-AMPS), Universal Mobile Telecommunications System (UMTS), Radio Frequency (RF), Personal Communication Network (PCN), Global System for Mobile Communications (GSMC), Worldwide Interoperability for Microwave Access (WiMAX), Generic Packet Radio Services (GPRS), Personal Communications Services (PCS), Cellular Digital Packet Data (CDPD), Wireless Application Protocol (WAP), Digital Audio Broadcasting (DAB), 802.11a, 802.11b, or other types of wireless interfaces for the utility control device 12.

The wireless gateway 14 may be virtually any device that forwards network traffic. Such a device may include, for example, a router, a proxy, a firewall, an access point, a link load balancer, a device that performs network address translation, or any combination of the preceding devices. The wireless gateway 14 may recognize packets that are part of a particular communication protocol or are the same network connection or application session. The wireless gateway 14 may perform special processing on such packets including granting access to a client machine, logging or not logging an event, prioritization, or network address and port translation.

Utility server 18 includes any computing device capable of establishing or maintaining a network connection with a utility control device. In one embodiment, server 18 is configured to operate as a public or private web server or web services device. The server 18 can also operate as a messaging server or File Transfer Protocol (FTP) server. In addition, server 18 can be a single component in a larger online application. Devices that can operate as server 18 include, but are not limited to, personal computers, multi-processor systems, microprocessor-based or programmable consumer electronics, network personal computers, or integrated devices combining one or more of the preceding devices.

Figure 2:
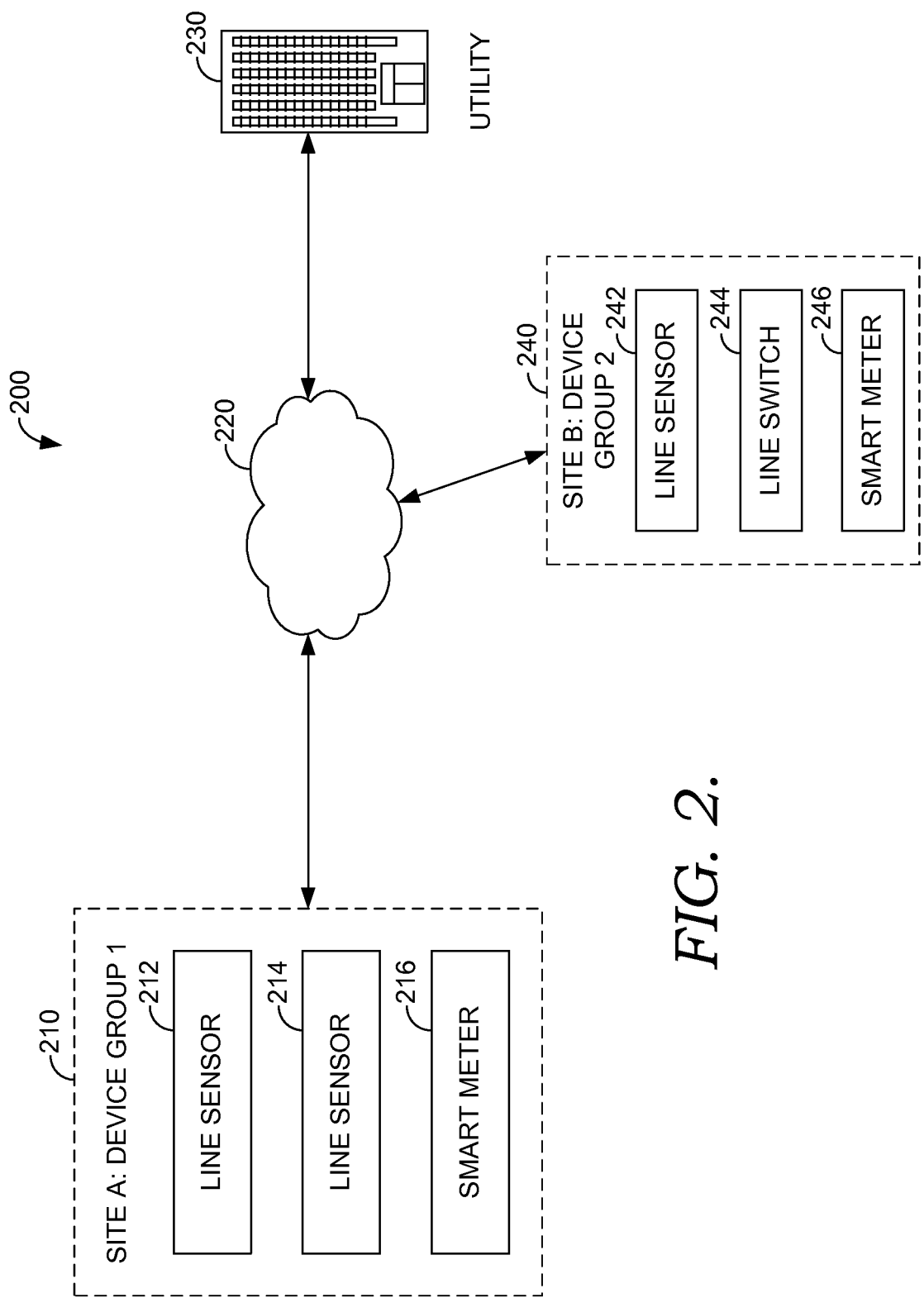
FIG. 2 is a network diagram of communications occurring between utility equipment according to embodiments of the invention.

Although FIG. 1 illustrates the utility control device 12 in communication with server 18, as can be appreciated, utility control device 12 can wirelessly communicate with other computing devices, such as other utility control devices, as shown in FIG. 2.

The utility control device 12 illustrated in FIG. 1 operates as part of the wireless network system 10, for example, based on standards proposed by the Institute of Electrical and Electronic Engineers (IEEE), International Telecommunications Union-Telecommunication Standardization Sector (ITU), Internet Engineering Task Force (IETF), Wireless Application Protocol (WAP) Forum, Extensible Markup Language (XML), Web API (Application Programming Interface), HTML5, Java Community, the American National Standard Institute (ANSI), or other proprietary standards.

Each utility control device 12 is coupled to a communication tower 13 via a wireless link, as illustrated in FIG. 1. In embodiments, each utility control device 12 is capable of communicating with the communication tower 13 using multiple frequency bands. A frequency band is a selected frequency range in the electromagnetic spectrum. Selected frequency bands are designated for use with wireless communications such as wireless telephony. In some cases, the utility control device 12 may use frequency bands, frames, air-interface allocation units (slots), etc. specified by the WiMAX or LTE specifications. The communication tower 13 may be any wireless system that provides the air interface to utility control device 12. Communication tower 13 includes a base transceiver station (BTS). Communication tower 13 may include transceivers, power amplifiers, combiners, duplexers, and antennas. Communication tower 13 may also include other components, such as a control function or control computer.

Mobile communication technology can use various standards and protocols to transmit data between a base transceiver station (BTS) of the communication tower 13 and a utility control device 12. A first utility control device may be using a first frequency band. A second utility control device may be using a second frequency band. The first utility control device may be associated with a first wireless interface with the communication tower 13, while the second utility control device may be associated with a second wireless interface with the communication tower 13. An alternative embodiment uses multiple communication towers, such as communication tower 13, that each communicate at one or more frequency bands. A wireless interface may correspond to an uplink communication from the utility control device 12 to the communication tower 13, or a downlink communication from the communication tower 13 to the utility control device 12.

Embodiments of the invention include, among other things, a method, system, or set of instructions embodied on one or more computer-readable storage media to prioritize utility communications. Computer-readable storage media include both volatile and nonvolatile media, removable and nonremovable media, and media readable by a database and various other network devices. By way of example, and not limitation, computer-readable media may comprise computer storage media and communication media. Computer storage media includes both volatile and nonvolatile, removable and nonremovable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Turning now to FIG. 2, a series of communications occurring between exemplary utility control devices and a central utility server are shown, in accordance with an embodiment of the present invention. FIG. 2 includes two different groups of devices. Device group 1 210 includes a line sensor 212, (other distribution automation device, water control, gas controlline sensor 214), and a smart meter 216. Only three utility control devices are shown within group 1 for the sake of simplicity. In actual embodiments, a device group could have hundreds or thousands of utility control devices. The devices may be grouped by geographic location, function, or by some other factor.

The line sensors 212 and 214 monitor electrical conditions at different points in an electrical utility's transmission system. The smart meter 216 measures electrical consumption at a point, such as a home or business. The smart meter 216 may periodically communicate electrical consumption data to the utility 230. Similarly, the line sensors 212 and 214 may also communicate line conditions to the utility or to other devices such as those in device group 2 240.

Device group 2 240 includes a line sensor 242, a line switch 244, and a smart meter 246. The line switch 244 may open and close, or otherwise adjust, current flow through part of the utility's transmission system.

The communications from the different device groups may be identified as part of the device group. For example, messages may include a device or group identity within a header. Each device group includes wireless devices that communicate with base stations, not shown. The communications may transfer through a core network associated with the service provider and eventually through a wide-area network to the utility server 230. The utility server 230 may collect information from utility control devices and provide instructions to utility control devices to adjust control settings within the utility's infrastructure. In other words, the utility server 230 may serve as a centralized control for utility control devices. The utility server 230 may generate messages that notify the network components that an emergency condition is detected and to change the QOS associated with utility communications.

Various networks through which the communications travel are depicted as network 220. At various times, the priority of messages traveling through network 220 and to the various devices may be adjusted. For example, during emergency conditions the priority may be increased. The priority increase may apply to messages being communicated by the devices within the groups and/or to messages sent to the devices from the utility or from device to device.

Even within the different groups, different priorities could be given to different types of devices. For example, a device with only a capacitor (limited power supply) to generate a last gasp power outage message may be given higher priority than a device with battery backup that may have the opportunity to transmit messages for a longer period of time.

In another embodiment, different priority is given to different devices within the groups based on the importance of the device. For example, a line sensor, pipeline monitor, pump or switch may be given a higher priority than a smart meter because they are more integral to overall infrastructure operation. The core network may enter an emergency mode during which the priority is adjusted. Once the emergency is over, the messaging traffic may return to a normal priority. In one embodiment, the utility informs the carrier about an emergency and the carrier automatically adjusts the quality of service.

Figure 3:
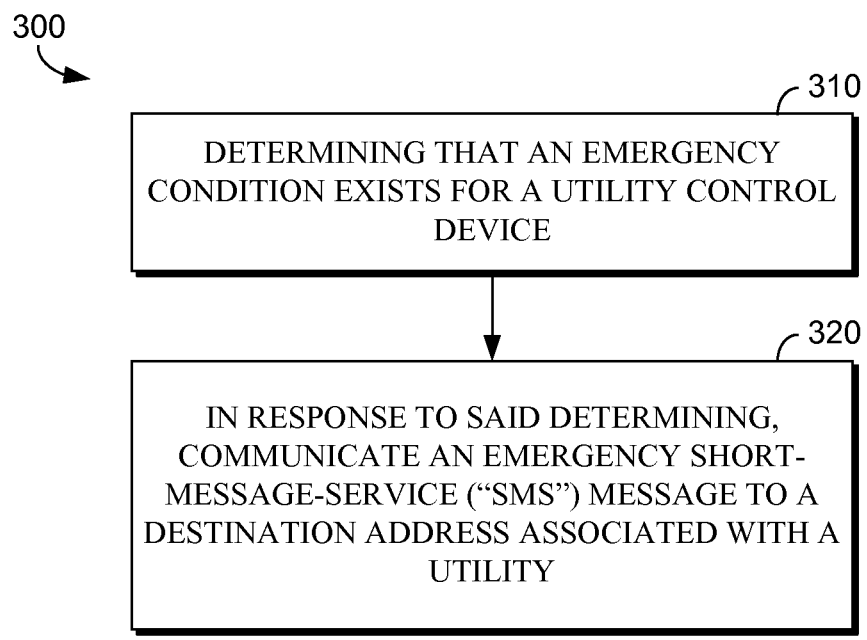
FIG. 3 is a flow diagram illustrating a method of prioritizing utility communications according to embodiments of the invention.

Turning now to FIG. 3, a method 300 for prioritizing utility communications is shown, in accordance with an embodiment of the present invention. The utility may be an electrical utility, a water utility, a gas utility, or some other utility. At step 310, an emergency condition is determined to exist for a utility control device. As mentioned, the emergency condition could be a power outage, natural disaster, or other designated emergency.

The condition may be determined to exist based on a change in infrastructure conditions monitored by the utility control device. For example, a loss of power within a transmission line could be detected by a line monitor and result in a determination that an emergency condition exists. In another embodiment, a message received from another device is used to determine that an emergency condition exists for a utility control device. For example, a message received from a central utility server or from another device within the utility's network may indicate that a weather emergency exists.

Emergency conditions may exist for devices within geographic proximity to each other. For example, the utility may divide their infrastructure into zones or sections and the devices may be affiliated with each other based on those zones or sections. Thus, when one device detects an emergency, the remaining devices in the group may be put on notice that an emergency condition exists.

Turning now to step 320, in response to determining that an emergency condition exists, an emergency short-message-service ("SMS") message is communicated to a destination address associated with the utility that operates the utility control device. In one embodiment, the utility control device communicates over a different radio communication protocol during normal conditions. The utility control device may use SMS messages only during periods of an emergency or when an emergency condition is determined to exist. In one embodiment, the SMS message is sent to a short code that is selected based on the emergency detected. For example, a power outage could have a first short code, a power surge could have a second short code, and so forth.

Figure 4:
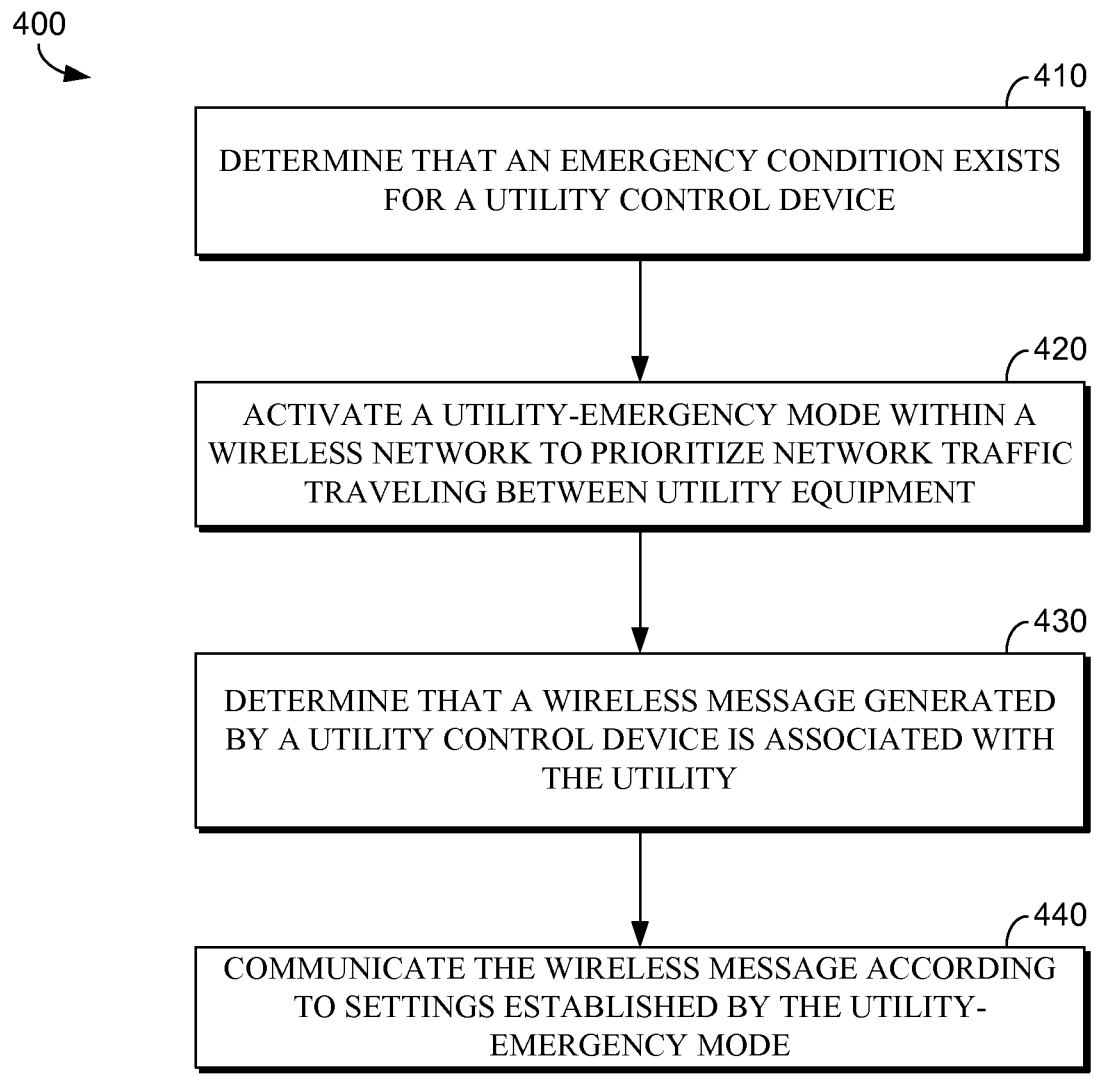
FIG. 4 is a flow diagram illustrating a method of prioritizing utility communications according to embodiments of the invention.

Turning now to FIG. 4, a method 400 of prioritizing utility communications is shown, in accordance with an embodiment of the present invention. At step 410, an emergency condition is determined to exist for a utility control device. A condition may be determined to exist based on receiving an SMS message from the utility control device. The SMS message may be associated with a particular emergency via a short code or other messaging content.

At step 420, a utility-emergency mode is activated within a wireless network cellular network to prioritize network traffic traveling between utility equipment. The utility equipment includes both utility control devices and back-end utility management resources, such as utility servers. The network traffic associated with the utility may be identified based on known IP addresses or other destination addresses associated with the various messages. In one embodiment, header information within a message is used to identify the message as being associated with a utility.

Turning now to step 430, a wireless message generated by a utility control device is determined to be associated with the utility. As mentioned, the source or destination address may be compared with a pre-authorized source, pre-authorized destination, and/or a group of known destination addresses to determine the message is associated with the utility. In addition, header information or other information within the body of the message may identify it as associated with a utility.

At step 440, the wireless message is communicated according to settings established by the utility-emergency mode. The settings provide a higher priority for messages associated with the utility. The higher priority may be with reference to both utility messages communicated during normal conditions and other network public and private traffic.

Figure 5:
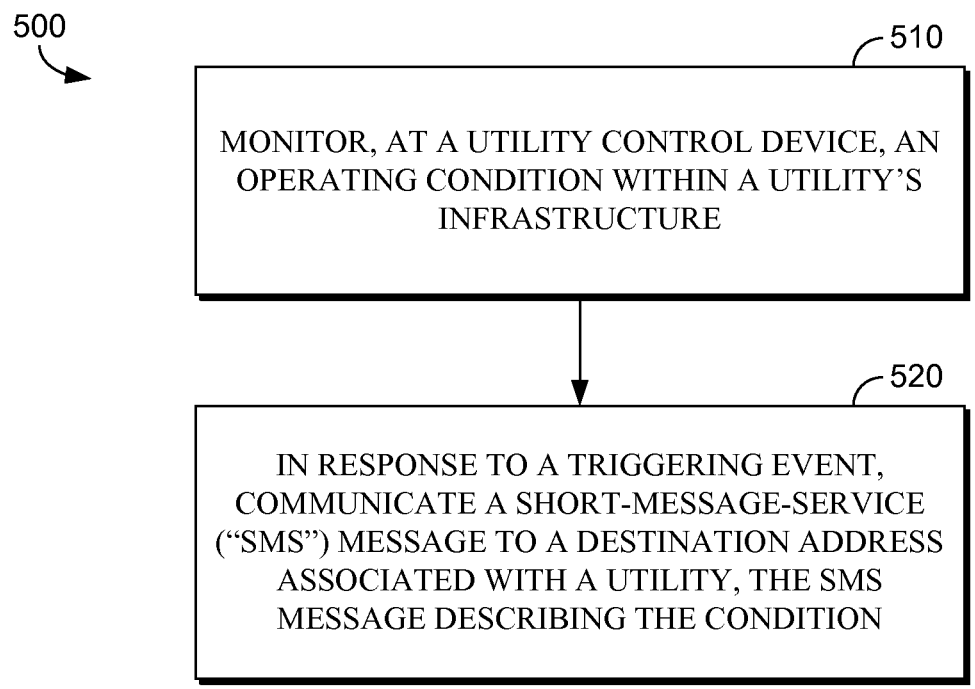
FIG. 5 is a flow diagram illustrating a method of prioritizing utility communications according to embodiments of the invention.

Turning now to FIG. 5, a method 500 of prioritizing utility communications is shown, in accordance with an embodiment of the present invention. At step 510, an operating condition within a utility's infrastructure is monitored by a utility control device. Examples of conditions that may be monitored by different utility control devices have been described previously.

At step 520, in response to a triggering event, a short-message-service SMS message is communicated to a destination address associated with a utility. The SMS message describes the condition monitored. Different conditions have been described previously. The trigger may be an emergency event such as a natural disaster or power outage. The trigger could also be a failure of communications over a different, or non-SMS, radio access technology.

Many different arrangements of the various components depicted, as well as components not shown, are possible without departing from the spirit and scope of the several embodiments of the invention. Embodiments of the invention have been described with the intent to be illustrative rather than restrictive.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable storage media storing computer-readable instructions thereon, that when executed by a computing device, perform a method prioritizing utility communications, the method comprising:
   determining that an emergency condition exists for a utility control device coupled, via a wireless link, to a communication tower having a base transceiver station, wherein the communication tower comprises a tower, wherein the tower comprises a structure used for mounting one or more antennas;
   generating a message, by the utility control device, that indicates the presence of the emergency condition;
   activating a utility-emergency mode within a cellular network to prioritize network traffic traveling between utility equipment;
   determining that the message generated by the utility control device is associated with the utility;
   establishing settings on the cellular network that correspond to the utility-emergency mode, wherein the settings cause a quality of service (QOS) change that results in handling messages associated with the utility with an increased priority relative to overall message traffic; and
   sending communications associated with the utility via the cellular network according to settings established by the utility-emergency mode.

2. The media of claim 1, wherein the settings cause a quality of service (QOS) change that results in handling messages associated with the utility with an increased priority relative to utility traffic during normal conditions.

3. The media of claim 1, wherein the emergency condition is a power outage.

4. The media of claim 1, wherein the emergency condition is a natural disaster.

5. The media of claim 1, wherein the wireless message generated by the utility control device is determined to be associated with the utility through a short code within the wireless message.

6. The media of claim 1, wherein the wireless message generated by the utility control device is determined to be associated with the utility through information within a header within the wireless message.

7. A method prioritizing utility communications, the method comprising:
   determining that an emergency condition exists for a utility control device that monitors conditions within a utility's infrastructure, wherein the utility control device is coupled to a communication tower via a wireless link, wherein the communication tower comprises a tower, wherein the tower comprises a structure used for mounting one or more antennas;
   generating a message, by the utility control device, that indicates the presence of the emergency condition;
   activating a utility-emergency mode within a cellular network to prioritize network traffic traveling between utility equipment;
   determining that the message generated by the utility control device is associated with the utility;
   establishing settings on the cellular network that correspond to the utility-emergency mode, wherein the settings cause a quality of service (QOS) change that results in handling messages associated with the utility with an increased priority relative to overall message traffic; and
   sending communications associated with the utility via the cellular network according to settings established by the utility-emergency mode.

8. The method of claim 7, wherein the settings cause a quality of service (QOS) change that results in handling messages associated with the utility with an increased priority relative to utility traffic during normal conditions.

9. The method of claim 7, wherein the emergency condition is a power outage.

10. The method of claim 7, wherein the emergency condition is a natural disaster.

11. The method of claim 7, wherein the wireless message generated by the utility control device is determined to be associated with the utility through a short code within the wireless message.

12. The method of claim 7, wherein the wireless message generated by the utility control device is determined to be associated with the utility through information within a header within the wireless message.

13. A computing system comprising:
   a processor; and
   computer storage memory having computer-executable instructions stored thereon which, when executed by the processor, implement a method prioritizing utility communications, the method comprising:
      determining that an emergency condition exists for a utility control device coupled, via a wireless link, to a communication tower operated by a mobile telephone carrier, wherein the communication tower comprises a tower, wherein the tower comprises a structure used for mounting one or more antennas;
      generating a message, by the utility control device, that indicates the presence of the emergency condition;
      activating a utility-emergency mode within a cellular network to prioritize network traffic traveling between utility equipment;
      determining that the message generated by the utility control device is associated with the utility;
      establishing settings on the cellular network that correspond to the utility-emergency mode, wherein the settings cause a quality of service (QOS) change that results in handling messages associated with the utility with an increased priority relative to overall message traffic; and
      sending communications associated with the utility via the cellular network according to settings established by the utility-emergency mode.

14. The system of claim 13, wherein the settings cause a quality of service (QOS) change that results in handling messages associated with the utility with an increased priority relative to utility traffic during normal conditions.

15. The system of claim 13, wherein the emergency condition is a power outage.

16. The system of claim 13, wherein the emergency condition is a natural disaster.

17. The system of claim 13, wherein the wireless message generated by the utility control device is determined to be associated with the utility through a short code within the wireless message.

18. The system of claim 13, wherein the wireless message generated by the utility control device is determined to be associated with the utility through information within a header within the wireless message.

* * * * *